United States Patent [19]

Mott

[11] 4,188,609

[45] Feb. 12, 1980

[54] LOW FREQUENCY HYDROPHONE

[75] Inventor: Gerald Mott, Pittsburgh, Pa.

[73] Assignee: Westinghouse Electric Corp., Pittsburgh, Pa.

[21] Appl. No.: 904,697

[22] Filed: May 10, 1978

[51] Int. Cl.$^2$ ............................................. H04B 13/00
[52] U.S. Cl. ....................................... 367/152; 367/166
[58] Field of Search .................. 340/8 R, 8 LF, 9, 10, 340/11, 12, 13, 14

[56] References Cited

U.S. PATENT DOCUMENTS

| | | | |
|---|---|---|---|
| 2,164,858 | 7/1939 | West | 340/13 |
| 2,438,925 | 4/1948 | Krantz | 340/11 |
| 3,187,300 | 6/1965 | Brate | 340/10 |
| 3,205,476 | 9/1965 | Massa | 340/10 |
| 3,438,021 | 4/1969 | Nelkin et al. | 340/261 |
| 3,872,421 | 3/1975 | Rogers | 340/10 |

Primary Examiner—Harold J. Tudor
Attorney, Agent, or Firm—D. Schron

[57] ABSTRACT

A fluid-filled compliant tube immersed in seawater to detect low frequency sound waves. The tube has only a middle portion of its length exposed to incident acoustic energy waves and a mode conversion causes a corresponding frequency acoustic wave in the tube, but of greatly reduced wavelength. Transducers are positioned at either end of the tube to detect the waves in the tube, the length of which is chosen to be a half wavelength of the waves in the tube.

16 Claims, 12 Drawing Figures

LOW FREQUENCY HYDROPHONE

BACKGROUND OF THE INVENTION

1. Field of the Invention

The invention in general relates to hydrophones, and more particularly to a hydrophone designed for listening to extremely low frequency acoustic waves.

2. Description of the Prior Art

A hydrophone is a device that responds to water-borne sound waves and delivers essentially equivalent electric waves. Such hydrophones find extensive use in the underwater environment for listening to very low frequency noise as may be produced, for example, by submarines or surface vessels.

In use, one or more hydrophones may be suspended, by a supporting cable for example, in the water medium to monitor the vehicular traffic. The design of some hydrophones, however, is such that when the hydrophone itself is accelerated due to movement of the supporting cable, an output signal is provided which is not related to any impinging low frequency acoustic waves, but instead is due to the acceleration of the unit.

A need exists for a relatively inexpensive simply constructed hydrophone which can endure the rigors of an underwater environment. Moreover, the hydrophone must be designed to respond to extremely low frequency acoustic waves and to be nonresponsive to physical movement of the hydrophone itself.

SUMMARY OF THE INVENTION

The above advantages are obtained with the hydrophone of the present invention, which includes an elongated, compliant, fluid-filled tube member with transducer means coupled to one and preferably to both ends of the tube. The tube member is immersed in the ambient water medium to be exposed to acoustic waves of frequency f and wavelength $\lambda_A$.

The impingement of acoustic waves on the tube member causes a corresponding pressure wave of frequency f but of a converted wavelength $\lambda_B$ in the fluid of the tube member where $\lambda_B$ is less than $\lambda_A$.

The length of the tube member from end-to-end is in the order of $(n\lambda_B/2)$ where n is an odd integer, and for higher sensitivity and better detection of a particular frequency, the middle section only of the tube is exposed to impinging waves. As the pressure waves move back and forth in the tube member of length $(n\lambda_B/2)$, the transducer means at either end thereof provide an output signal substantially equivalent to the frequency of the impinging waves.

DESCRIPTION OF THE PREFERRED EMBODIMENTS

Figure 1:
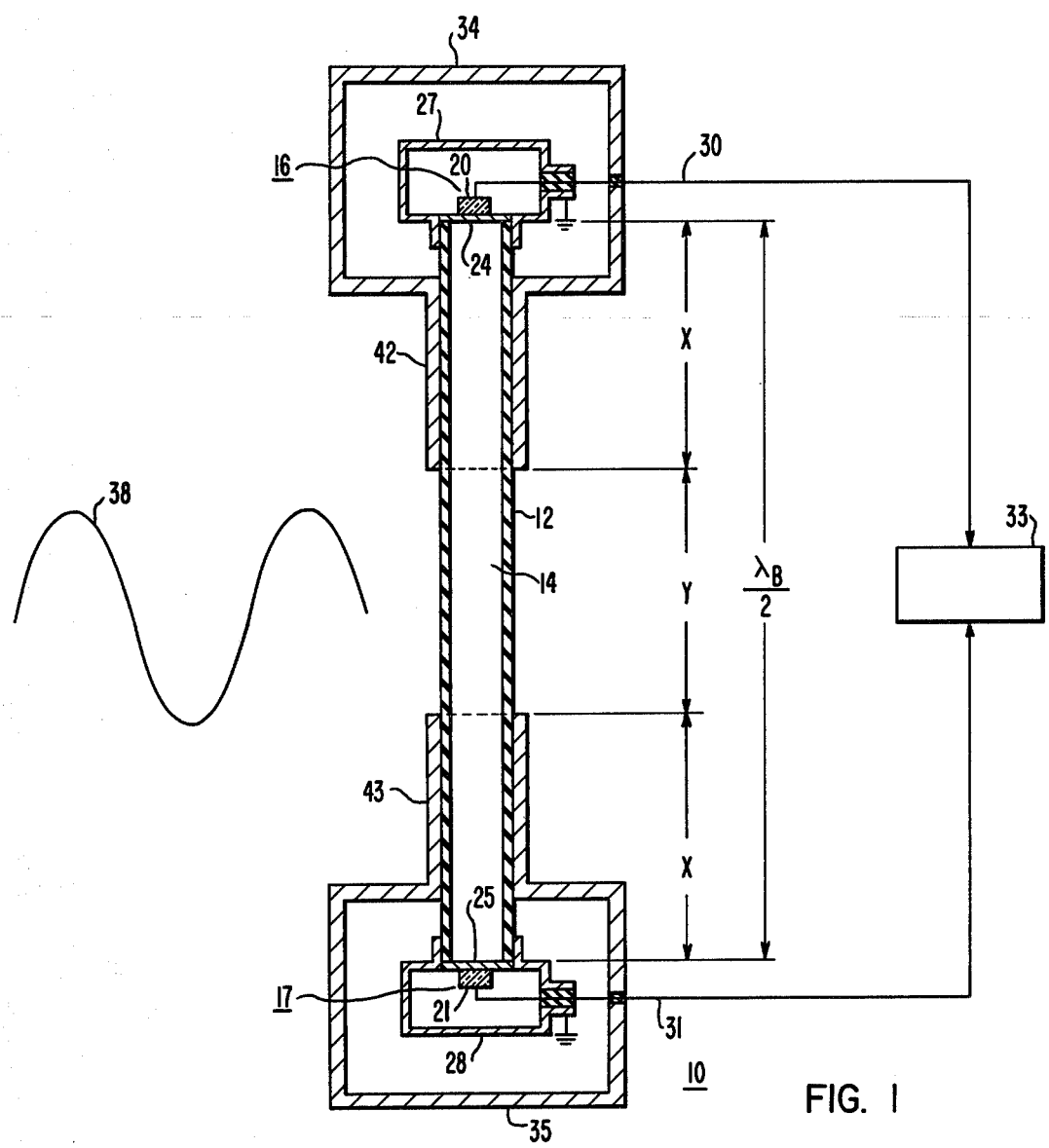
FIG. 1 is a view in section illustrating one embodiment of the present invention.

Referring now to FIG. 1, there is illustrated a hydrophone 10 which includes an elongated compliant tube member 12 such as rubber having contained therein a fluid 14, which in a preferred embodiment is a liquid such as water.

Transducer means 16 are coupled to the tube member 12 at one end thereof and for higher output signals and increased sensitivity additional transducer means 17 are coupled to tube member 12 at the other end thereof.

Each of the transducer means 16 and 17 includes a thin piezoelectric disc 20 and 21, respectively, each operating in the flexural disc or bender mode. Piezoelectric disc 20 has one surface thereof connected to a relatively thin membrane 24 in contact with fluid 14 and in a similar manner piezoelectric disc 21 is connected to a relatively thin membrane 25 in communication with the fluid in tube member 12. Membranes 24 and 25 may be formed as a part of respective sheet metal housings 27 and 28.

Leads 30 and 31 are adapted to conduct the electrical signals provided by the transducer means 16 and 17 to the electronic circuitry 33 for processing and interpretation.

The transducers together with respective housings are themselves positioned within respective rigid containers 34 and 35 fabricated, for example, of stainless steel. The interior of housings 27 and 28 and containers 34 and 35 may be air- or gas-filled, or may be filled with a noncorrosive liquid such as oil.

Fluid-filled tube members coupling with transducers at either end therof is a well-developed technology and is further described in U.S. Pat. No. 3,438,021 which illustrates two such tubes in side-by-side relationship buried beneath ground level for detection of intruders over a protected area.

An incident acoustic signal as represented by wave 38 (not to scale) will impinge upon the tube member 12 and through a mode conversion will cause corresponding acoustic pressure waves within the fluid 14. These pressure waves are then detected by means of transducers 16 and 17. If the entire tube 12 is exposed to the incident acoustic signal, the apparatus operates as a broadband receiver with a response such as illustrated by curve 40 of FIG. 2 wherein frequency is plotted on the horizontal axis and transducer response, in volts, is plotted on the vertical axis. A more selective frequency response at high signal to noise levels may be obtained if the tube is divided into three sections illustrated as end sections X and middle section Y and if both end sections are blocked from the incoming wave and only the middle section of tube exposed thereto. For this reason, containers 34 and 35 have respective sleeve members 42 and 43 depending therefrom so that sleeve members 42 and 43 in conjunction with housings 34 and 35 rigidly surround the end sections X of tube member 12.

Figure 2:
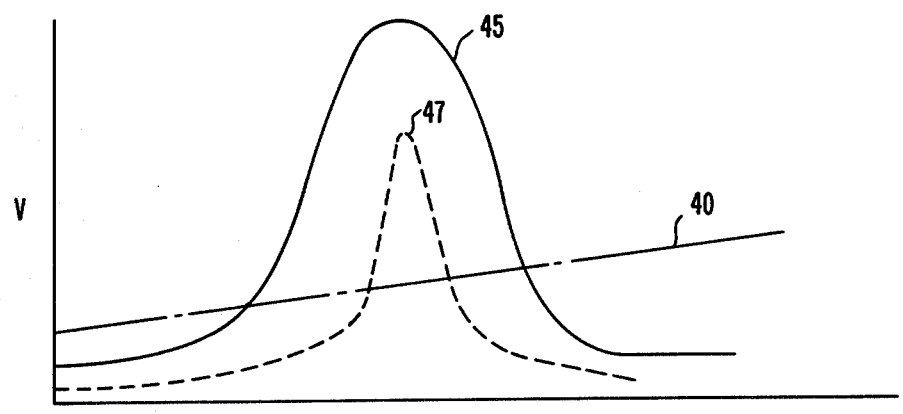
FIG. 2 shows curves illustrating the response of the apparatus of FIG. 1 under different conditions.

In a preferred embodiment the middle section is approximately one-third of the entire length of the tube member 12 and with such criteria, a response such as illustrated by curve 45 in FIG. 2 may be obtained. Decreasing the length of exposed section Y will narrow down the frequency response so as to be more selective;

however, as illustrated by curve 47, the response of the apparatus will be reduced.

When an acoustic signal as represented by wave 38 strikes the middle portion of tube member 12 there is a conversion of the incident wave to a different mode within the fluid 14, and this mode is sometimes referred to as a squirter mode caused by the incident acoustic wave squeezing the wall of the tube, the radial movement of which is converted into axial motion.

The acoustic propagation velocity in seawater is approximately 5,000 feet per second (1524 meters per second), whereas it has been determined that the acoustic propagation velocity in the tube member 12 is approximately 300 feet per second (91.44 meters per second) and for this reason, if the wavelength of the acoustic wave 38 is $\lambda_A$ and the wavelength of the acoustic signal in fluid 14 is $\lambda_B$, $\lambda_B < \lambda_A$.

In order to optimize the conversion and the output signal, the length of tube member 12 is made approximately equal to $(\lambda_B/2)$ or an odd multiple thereof. In this manner by fabricating the tube member 12 to be a half wavelength long (a half wavelength of the wave in fluid 14) the frequency of the fundamental resonance in the tube member 12 is tied to and reenforced by the incident pressure wave frequency.

Figure 3A:
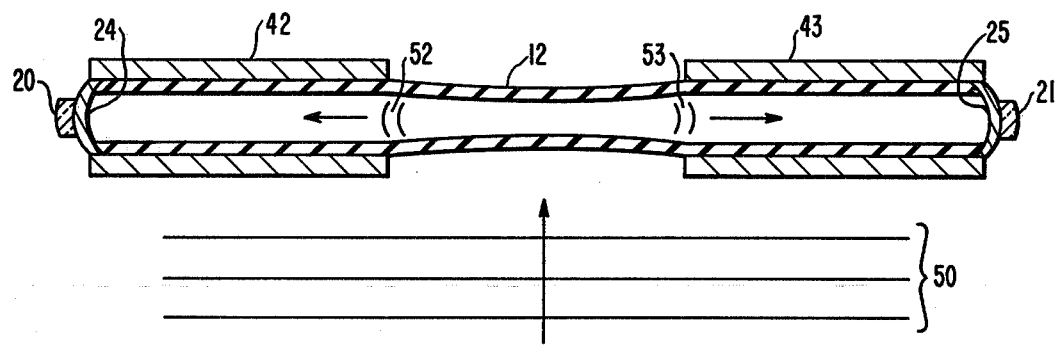
FIGS. 3A and 3B illustrate the tube of FIG. 1 in response to impinging acoustic waves.
Figure 3B:
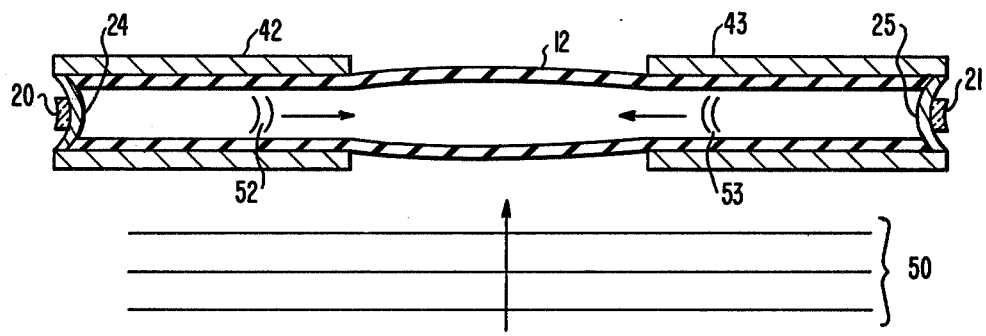

FIGS. 3A and 3B illustrate a portion of the apparatus illustrated in FIG. 1 in addition to an incident wave designated by wave fronts 50. FIG. 3A illustrates the situation where the incoming wave compresses the middle third of the tube 12 and causes pressure waves represented by numerals 52 and 53 to travel in opposite directions toward the ends of the tube causing the membranes 24 and 25, together with connected piezoelectric discs 20 and 21 to bulge outwardly. On the next half-cycle of the incoming wave the length of tube 12 and the pressure conditions are such that the midsection of tube 12 bulges outwardly whereas membranes 24 and 25 are bowed toward one another. The drawings of FIGS. 3A and 3B are not to scale and by way of illustration if the incoming acoustic signal has a frequency of one hertz, the wavelength, the distance between the lines of wave front 50, will be 5,000 feet (1524 meters) apart. Assuming a propagation velocity of 300 feet per second (91.44 meters per second) in tube member 12, the wavelength of the signal therein will be 300 feet (91.44 meters) and the tube length will be 150 feet (45.72 meters). For an incoming frequency of 100 hertz, the incoming wave will have a wavelength of 50 feet (15.24 meters) in the ambient medium and 3 feet (0.914 meter) in tube member 12, which will be of an overall length of 1.5 feet (0.457 meter) and have an overall exposed tube length of 6 inches (0.152 meter).

Figure 4A:
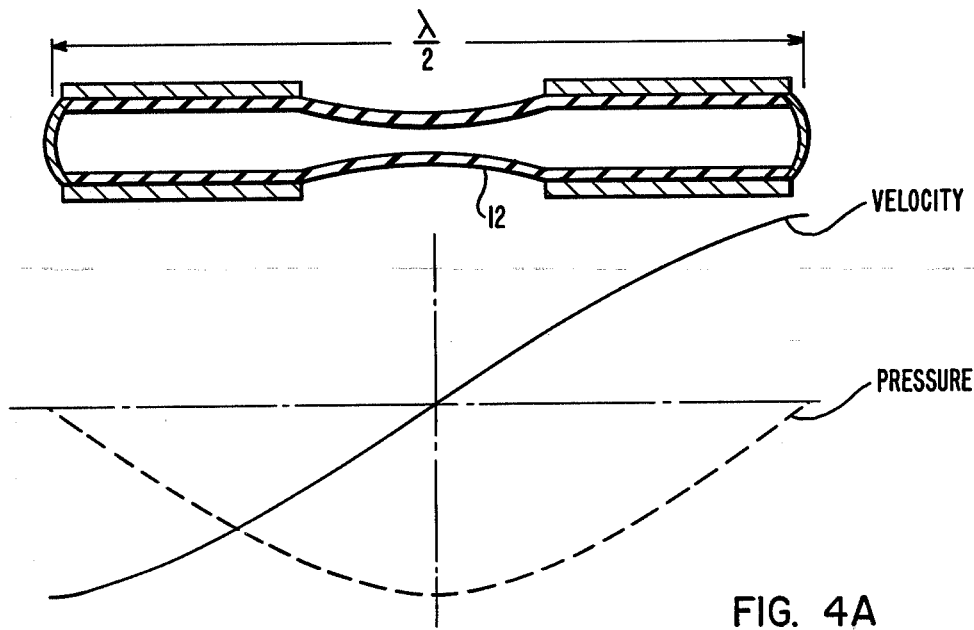
FIGS. 4A and 4B illustrate the tube of FIG. 1 in conjunction with velocity and pressure distributions therein at two different points in time.
Figure 4B:
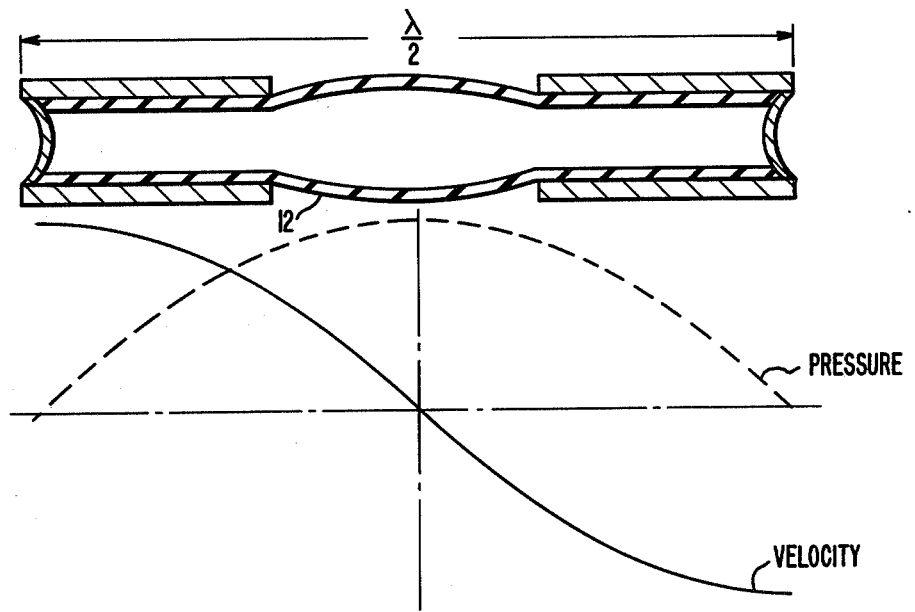

After several cycles of the impinging wave, the action may be described as 2 waves traveling in the tube member 12, one to the right in a long train and the other to the left in a long train. The waves hit the ends of the tube member and are reflected therefrom with the construction of the apparatus being such that the waves always push out or pull in the ends at the same time. FIGS. 4A and 4B illustrate the standing waves of velocity and pressure within the tube member 12 at 2 instance of time wherein the waves are at opposite extremes. FIG. 4A illustrates a maximum negative pressure at the center of the tube member 12 with a maximum positive and a maximum negative velocity at the ends thereof. FIG. 4B illustrates a maximum positive pressure at the center of the tube with a maximum positive and a maximum negative velocity at the left and right ends of the tube, respectively. The maximum pressure at the center gives rise to maximum velocity at the ends so that maximum response is derived from the transducer means positioned at the ends of the tube.

Figure 5:
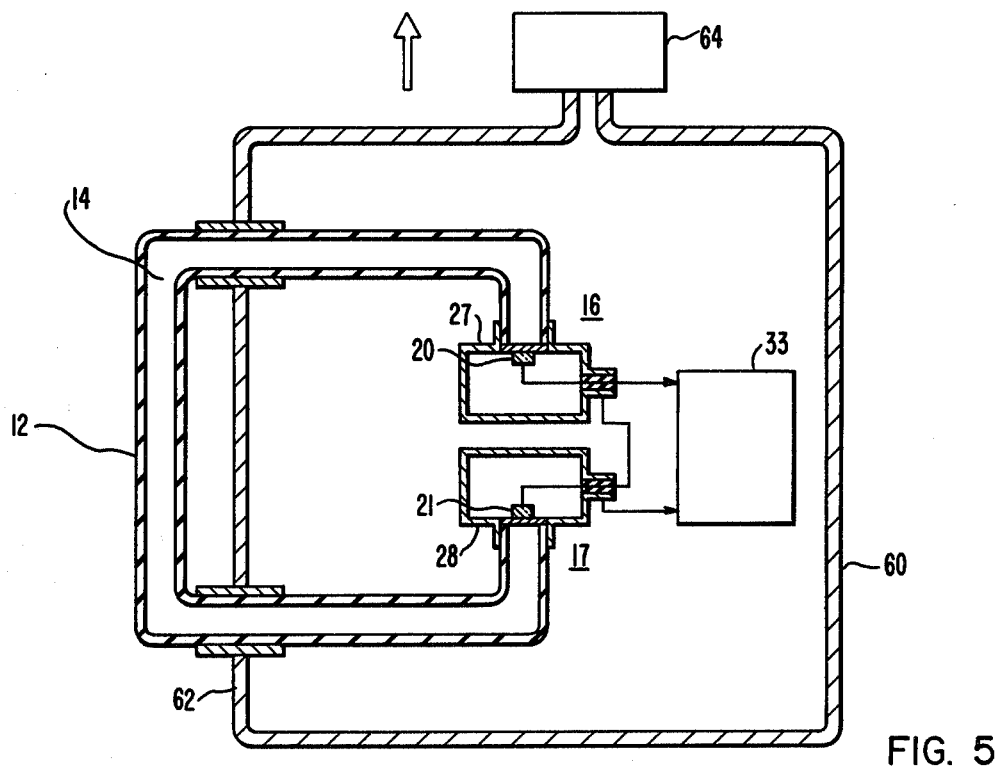
FIG. 5 is a view in section of another embodiment of the present invention.

The propagation characteristics of the pressure wave after conversion of the incident wave to the squirter mode are little affected by bending the tube member. Accordingly, a more compact unit may be constructed which is similar in principle to the embodiment of FIG. 1 and which possesses the advantages of the embodiment of FIG. 1 in addition to other advantages. One such embodiment is illustrated in FIG. 5 wherein components similar to that in FIG. 1 have been given the same reference numerals.

Tube member 12 is bent such that only the midsection thereof is exposed to the ambient medium while the two end sections are disposed within a rigid container 60. The two end sections of tube member 12 pass through a wall 62 of container 60 and are further bent around such that the transducer means 16 and 17 are in juxtaposed position and preferably such that the piezoelectric discs 20 and 21 are coaxial. It can be seen therefore that with the construction of FIG. 5, the function of the sleeve members 42 and 43 of FIG. 1 have been replaced by the single rigid container 60. If desired, the interior of container 60 may be air- or gas-filled, and depending upon the operating depth, a pressure compensation system 64 may be provided for deep operating depths.

Figure 6A:
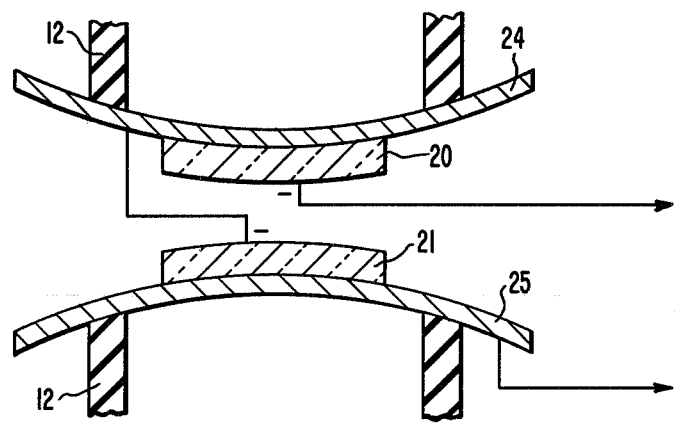
FIGS. 6A, 6B and 6C illustrate the transducer means of FIG. 5, in more detail under certain operating conditions.
Figure 6B:
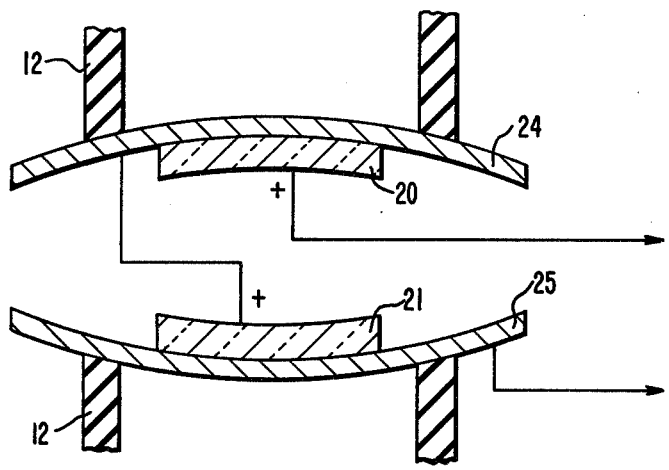
Figure 6C:
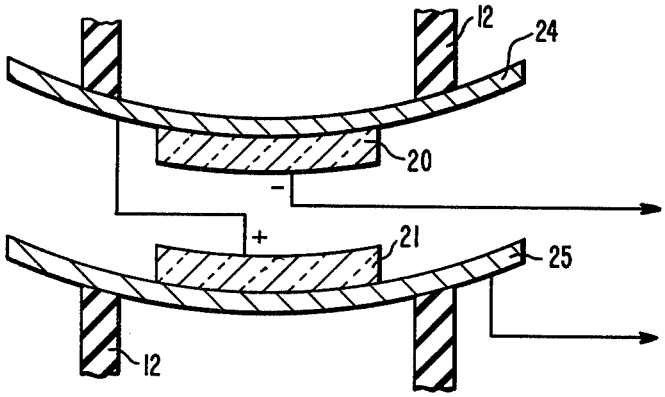

With the placement of the transducer means 16 and 17 as illustrated, and by connecting the output voltages of the piezoelectric discs in series, all large scale accelerations of the apparatus will be electrically balanced. For example, FIGS. 6A and 6B illustrate the piezoelectric disc polarity outputs in response to an incident acoustic wave, FIG. 6A illustrating a bowed-out condition, as in FIG. 3A, and FIG. 6B illustrating a bowed-in condition as in FIG. 3B. The polarities of the generated signals are such that they add in series and provide a maximum output signal. If, however, the apparatus is accelerated, for example in the direction of the arrow of FIG. 5, the transducer means will assume the shapes illustrated in FIG. 6C. With the series connection illustrated, the polarities generated by the acceleration will cancel each other out and thus no erroneous output signal will be provided as a result of movement of the apparatus.

Since the optimized length of tube member 12 is $(\lambda_B/2)$ maximum response will be provided corresponding to a particular frequency. If it is desired to examine incoming acoustic signals for other frequencies, the length of the tube member may be varied so as to vary its value of $(\lambda_B/2)$.

Figure 7:
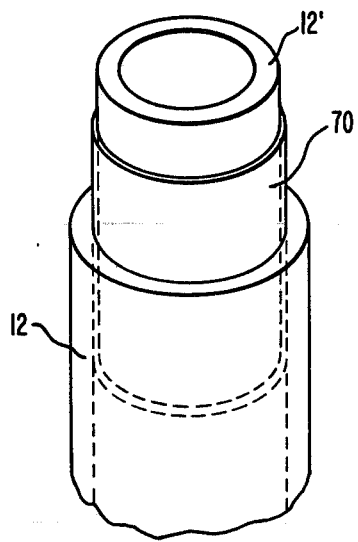
FIG. 7 illustrates a tube, as in FIG. 1, however with means for adjusting the length thereof.

One method of accomplishing this variable length is illustrated in FIG. 7 and includes a tube member in two parts, 12 and 12', with the outside diameter of the tube 12' being slightly less than the inside diameter of tube 12. A short section of sleeve 70 separates the two tube parts so as to allow for sliding engagement for varying the length of the combination.

Figure 8:
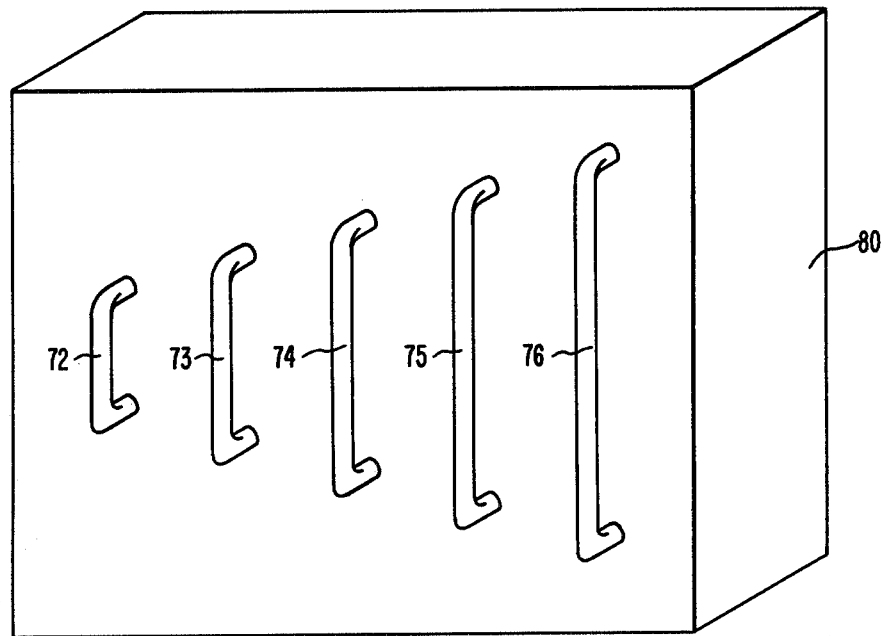
FIG. 8 illustrates an embodiment for the detection of multiple frequencies.

If it is desired to cover a wide range of frequencies without the requirement for adjusting tube lengths, a plurality of different length tube members may be provided such as illustrated in FIG. 8. Five tube members 72 to 76 are illustrated, each being identical to that illustrated in FIG. 5 except that the individual lengths thereof are different so as to respond to different incoming frequencies. The transducer terminations of the tubes are all housed in a common rigid housing 80.

In addition to acceleration canceling advantages experienced by the apparatus of FIGS. 5 or 8, greater output signals are provided due to the fact that the midsection of the tube or tubes are positioned adjacent a wall of the container which acts as a reflector for the incoming wave, thus nearly doubling the pressure effects on the exposed portion of the tube member.

What is claimed is:

1. a low frequency hydrophone comprising:
   (a) an elongated, compliant, fluid-filled tube member;
   (b) transducer means coupled to said tube member at at least one end thereof;
   (c) said tube member being for immersion in the ambient water to be exposed to acoustic waves of frequency f and wavelength $\lambda_A$;
   (d) the impingement of said acoustic waves on said tube member causing a corresponding pressure wave of frequency f and wavelength $\lambda_B$ in said fluid in said tube member, where $\lambda_B < \lambda_A$;
   (e) said transducer means providing an output signal in response to said pressure wave in said fluid in said tube member;
   (f) the length of said tube member from said transducer means to the other end thereof being in the order of $(n \lambda_B/2)$ where n is an odd integer.

2. Apparatus according to claim 1 wherein:
   (a) said tube member being divided along the length thereof into three sections, a midsection and two end sections; and which includes
   (b) means for covering said two end sections so that only said midsection is exposed to said impinging acoustic waves.

3. Apparatus according to claim 2 wherein:
   (a) said midsection is approximately one-third the length of said tube member.

4. Apparatus according to claim 2 which includes:
   (a) additional transducer means coupled to said other end thereof and operable to provide an output signal in response to said pressure wave in said fluid in said tube member.

5. Apparatus according to claim 4 wherein:
   (a) said transducer means and additional transducer means are positioned within respective first and second containers; and which includes
   (b) first and second sleeve members, respectively, extending from said first and second containers and surrounding respective ones of said end sections of said tube member.

6. Apparatus according to claim 5 wherein:
   (a) said transducer means and additional transducer means mounted in respective first and second housings within said first and second containers.

7. Apparatus according to claim 6 wherein:
   (a) said first and second containers are liquid-filled.

8. Apparatus according to claims 6 and 7 wherein:
   (a) said first and second housings are liquid-filled.

9. Apparatus according to claim 1 wherein:
   (a) said tube member is liquid-filled.

10. Apparatus according to claim 4 wherein:
    (a) said transducer means and additional transducer means are mounted in respective first and second housings; and which includes
    (b) a container;
    (c) said first and second housing both being within said container in juxtaposed position;
    (d) said midsection of said tube member being positioned outside of said container with said two end sections extending through a wall of said container and positioned within said container.

11. Apparatus according to claim 10 which includes:
    (a) a plurality of similar other tube members each having a midsection outside of, and end sections inside of said container;
    (b) said tube members having different lengths to maximize response to respectively different frequencies.

12. Apparatus according to claim 1 wherein:
    (a) said tube member is adjustable in length so that said transducer means will be responsive to different selected frequencies dependent upon said chosen length.

13. Apparatus according to claim 10 wherein:
    (a) said transducer means and additional transducer means include respective piezoelectric discs.

14. Apparatus according to claim 13 wherein;
    (a) each piezoelectric disc has first and second parallel surfaces; and
    (b) first and second relatively thin membranes in contact with the fluid in said tube member at respective opposite ends thereof;
    (c) each said piezoelectric disc having its first surface in contact with a respective one of said membranes.

15. Apparatus according to claim 14 wherein:
    (a) said piezoelectric discs are coaxial.

16. Apparatus according to claim 15 wherein:
    (a) said second surfaces of said discs are arranged to move toward and away from one another in response to an acoustic wave and to move in the same direction in response to physical movement of said container;
    (b) the output signals of said transducer means and said additional transducer means being in series to tend to cancel any effects due to said physical movement of said container.

* * * * *